United States Patent [19]
Inoue et al.

[11] Patent Number: 6,116,047
[45] Date of Patent: *Sep. 12, 2000

[54] DOUBLE EFFECT ABSORBTION COLD OR HOT WATER GENERATING MACHINE

[75] Inventors: Naoyuki Inoue; Takashi Yasuda; Shouji Tanaka; Makoto Agatsuma; Teruo Shiraishi, all of Tokyo, Japan

[73] Assignee: Ebara Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/164,564

[22] Filed: Oct. 1, 1998

[30] Foreign Application Priority Data

Oct. 2, 1997 [JP] Japan ................................. 9-284281

[51] Int. Cl.[7] ................................................ F25B 15/00
[52] U.S. Cl. ................................. 62/476; 62/238.3
[58] Field of Search .......................... 62/324.2, 238.3, 62/476

[56] References Cited

U.S. PATENT DOCUMENTS

| | | | |
|---|---|---|---|
| 3,555,839 | 1/1971 | Leonard, Jr. | 62/101 |
| 4,589,262 | 5/1986 | Nagao | 62/141 |
| 5,016,445 | 5/1991 | Wehr | 62/101 |
| 5,216,891 | 6/1993 | Ryan | 62/101 |

OTHER PUBLICATIONS

Japanese Laid–Open Patent Publication No. 3–158665 (English Abstract).
Japanese Laid–Open Patent Publication No. 58–37460 (English Abstract).
Japanese Laid–Open Patent Publication No. 58–184464 (English Abstract).

*Primary Examiner*—Henry Bennett
*Assistant Examiner*—Melvin Jones
*Attorney, Agent, or Firm*—Armstrong, Westerman, Hattori, McLeland & Naughton

[57] ABSTRACT

A double effect absorption cold or hot water generating machine can supply hot water from a water heater even when it is used for a cooling operation. The double effect absorption cold or hot water generating machine comprises an absorber, an evaporator, a high temperature generator, a low temperature generator, a condenser, a high temperature heat exchanger, a low temperature heat exchanger, and a water heater. The machine further comprises a refrigerant path in a refrigerating cycle including a path from the high temperature generator to the evaporator through a refrigerant branch point at which refrigerant vapor is branched, a heating side of the low temperature generator, and the condenser; a refrigerant path in a hot water cycle including a path from the refrigerant branch point to the high temperature generator and the evaporator through a hot water control valve, and a path for circulating refrigerant in the evaporator; and a water cooler provided in a hot water path in which hot water is heated by the water heater, the water cooler being provided in series with the water heater.

8 Claims, 5 Drawing Sheets

DOUBLE EFFECT ABSORBTION COLD OR HOT WATER GENERATING MACHINE

BACKGROUND OF THE INVENTION

1. Field of the Invention

The present invention relates to a double effect absorption cold or hot water generating machine, and more particularly to a double effect absorption cold or hot water generating machine which can supply hot water from a water heater even when it is used for a cooling operation.

2. Description of the Related Art

Conventionally, in a cold or hot water generating machine which can supply cold water and hot water simultaneously, it has been customary to use a system in which refrigerant vapor in a high temperature generator is introduced into a water heater where the refrigerant vapor is condensed to generate heat of condensation and hot water is produced. The hot water capacity is controlled by adjusting the amount of refrigerant liquid which is stored in the water heater. In this system, the utilized principle is that heat transfer with condensation is carried out at portions of the heat exchanger tubes which are not immersed in refrigerant liquid to thus effect large heat transfer, but poor heat transfer is effected at portions of the heat exchanger tubes which are immersed in refrigerant liquid. That is, effective heat transfer areas are adjusted by refrigerant liquid to control the amount of produced hot wafer.

In this system, in the case where the load of hot water is extremely small, even if the entire areas of the heat exchanger tubes are immersed in refrigerant liquid, in some cases, the output of hot water is larger than the load of hot water. To be more specific, even if the entire areas of the heat exchanger tubes are immersed in refrigerant liquid, refrigerant vapor is generated in the high temperature generator due to the load of cold water, the generated refrigerant vapor is condensed at the surface of refrigerant liquid in the water heater, and the heat of condensation is transmitted to hot water through the refrigerant liquid. Therefore, the temperature of hot water rises gradually to reach a value higher than the target temperature. Further, energy generated in a hot water pump is given to hot water to cause the temperature rise of hot water.

SUMMARY OF THE INVENTION

It is therefore an object of the present invention to provide a double effect absorption cold or hot water generating machine which can prevent the temperature of hot water from rising excessively in case of a small load of hot water even when it is used for a cooling operation.

In order to achieve the above object, according to the present invention, there is provided a double effect absorption cold or hot water generating machine comprising an absorber, an evaporator, a high temperature generator, a low temperature generator, a condenser, a high temperature heat exchanger, a low temperature heat exchanger, and a water heater; the double effect absorption cold or hot water generating machine further comprising: a refrigerant path in a refrigerating cycle including a path from the high temperature generator to the evaporator through a refrigerant branch point at which refrigerant vapor is branched, a heating side of the low temperature generator, and the condenser; a refrigerant path in a hot water cycle including a path from the refrigerant branch point to the high temperature generator and the evaporator through a hot water control valve, and a path for circulating refrigerant in the evaporator; and a water cooler provided in a hot water path in which hot water is heated by the water heater, the water cooler being provided in series with the water heater.

The water heater may comprise an adjusting mechanism for adjusting an output of hot water by liquid level of refrigerant liquid stored in the water heater.

The water cooler may comprise a cooling mechanism for cooling hot water by flowing cooling medium when the temperature of the hot water rises to a given value or higher, or when the output of the hot water is equal to or smaller than a given value.

The water heater may comprise a cooling mechanism for cooling hot water by flowing cooling medium in the water cooler when a hot water control valve for controlling liquid level of refrigerant liquid stored in the water heater is fully closed or is opened to a given degree or less. The cooling medium may comprise a cooling water or an air.

The above and other objects, features, and advantages of the present invention will become apparent from the following description when taken in conjunction with the accompanying drawings which illustrate preferred embodiments of the present invention by way of examples.

DETAILED DESCRIPTION OF THE PREFERRED EMBODIMENTS

Figure 1:
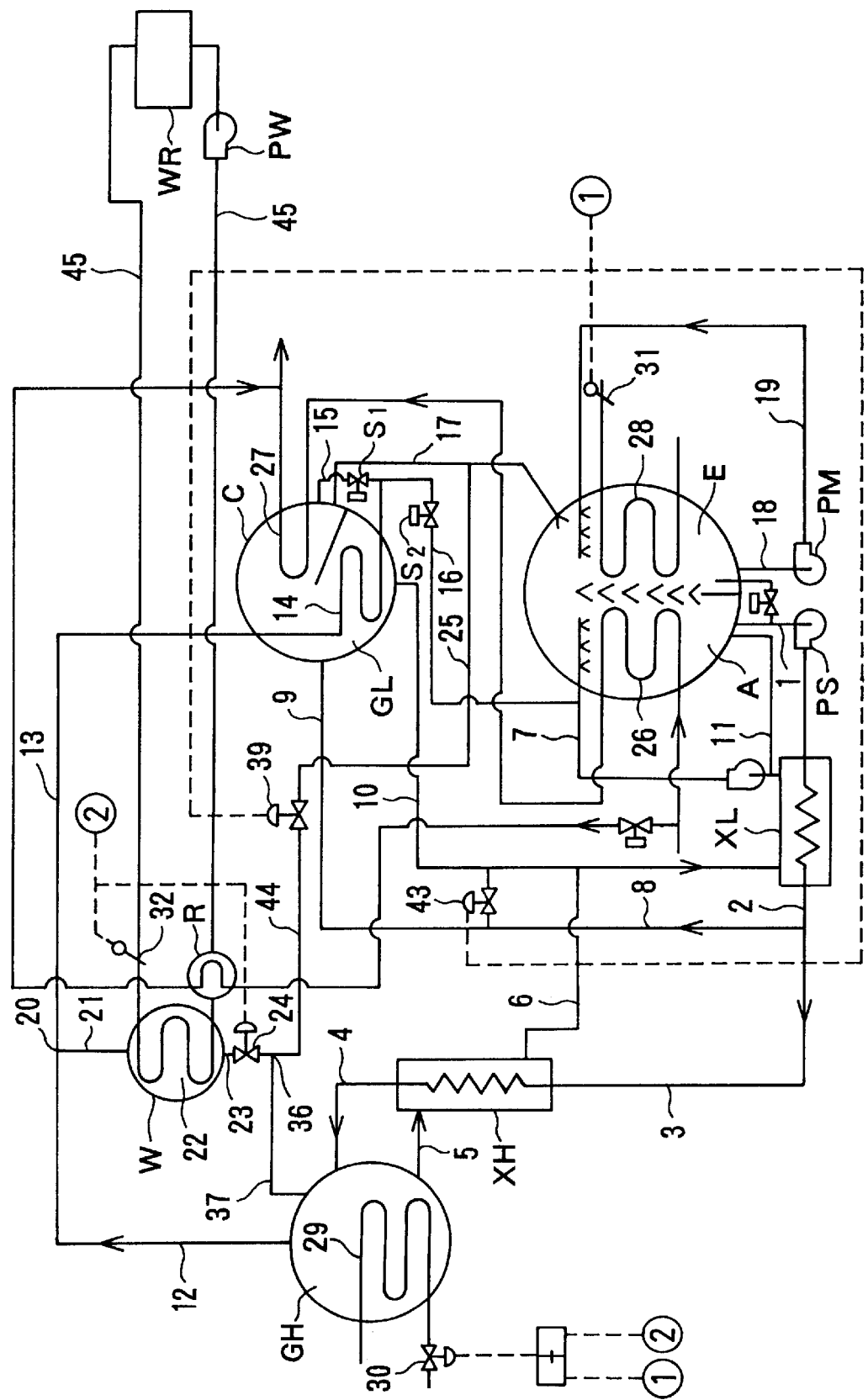
FIG. 1 is a hydraulic circuit of a double effect absorption cold or hot water generating machine according to an embodiment of the present invention.

Next, a double effect absorption cold or hot water generating machine according to an embodiment of the present invention will be described in detail with reference to drawings. FIG. 1 shows a hydraulic circuit of a double effect absorption cold or hot water generating machine according to an embodiment of the present invention. In the system illustrated in FIG. 1, there are provided an absorber A, an evaporator E, a high temperature generator GH, a low temperature generator GL, a condenser C, a water heater W, a high temperature heat exchanger XH, a low temperature heat exchanger XL, and a water cooler R. As a solution path, there are provided a solution pump PS and pipings 1, 2, 3, 4, 5, 6, 7, 8, 9, 10 and 11 to connect the above devices, thus forming a solution circulating path. As a refrigerant path, there are provided a refrigerant path in a refrigerating cycle and a refrigerant path in a hot water cycle.

The refrigerant path in the refrigerating cycle comprises a refrigerant path in a high temperature generator circuit including a path from the high temperature generator GH to the evaporator E through a piping 12, a refrigerant branch point 20, a piping 13, a heater 14, a piping 15 with a valve S1 which is branched from the heater 14, the condenser C, and a piping 17, and a path from a piping 16 with a valve S2 which is branched from the heater 14 to the absorber A through the solution piping 7; a refrigerant path in a low temperature generator circuit in which solution in the low temperature generator GL is evaporated, and the produced vapor is condensed in the condenser C and reaches the evaporator E through the piping 17; and a refrigerant path in an evaporator circuit comprising a refrigerant pump PM, pipings 18 and 19 for circulating refrigerant in the evaporator E.

The refrigerant path in the hot water cycle comprises a path from the piping 12 to the high temperature generator GH through the refrigerant branch point 20, a piping 21, a heating side 22 of the water cooler W, a piping 23 with a hot water control valve 24, a bypass branch point 36, and a bypass piping 37; and a main refrigerant path from the bypass branch point 36 to the piping 17, which is a part of the refrigerant path in the refrigerating cycle, through a piping 44 with a refrigerant liquid control valve 39, and a piping 25. The piping 25 may be connected to an outlet of the heater 14, or may be directly connected to the condenser C.

Hot water is fed to the water heater W by a hot water pump PW provided in a hot water path 45, and the hot water heated in the water heater W is supplied to a hot water load WR. The water cooler R is provided in the hot water path 45. In FIG. 1, reference numerals 26 and 27 represent a cooling water piping, respectively, and reference numeral 28 represents a cold water piping which is connected to a cold water load (not shown). Further, reference numeral 29 represents a heating piping, reference numeral 30 represents a heat source control valve 30, and reference numerals 31 and 32 represent a temperature sensor, respectively. The temperature sensor 31 serves to measure the load of cold water (cold water load), and the temperature sensor 32 serves to measure the load of hot water (hot water load).

Figure 2A:
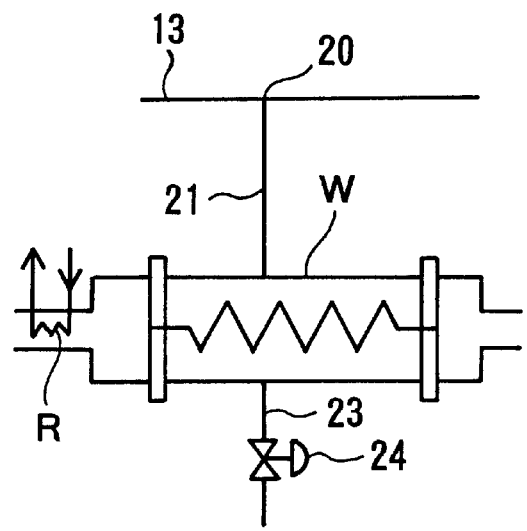
FIGS. 2A and 2B are a fragmentary enlarged view of a water heater including a water cooler, respectively.
Figure 2B:
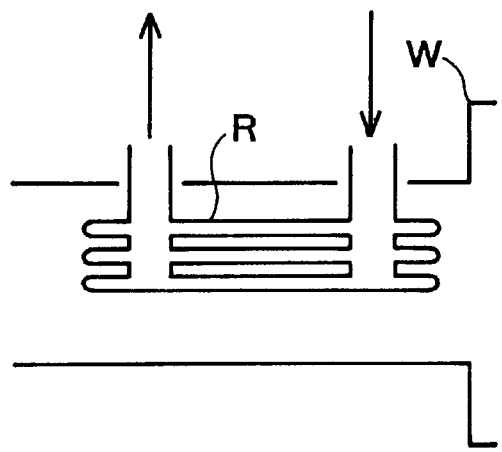
Figure 3A:
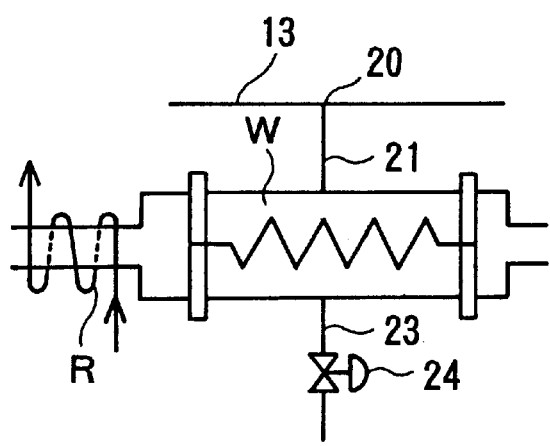
FIGS. 3A and 3B are a fragmentary enlarged view of another water heater including a water cooler, respectively.
Figure 3B:
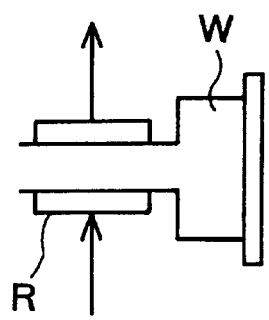

As shown in FIGS. 2A and 2B, the water cooler R may be provided in a water chamber of the water heater W (see FIG. 2A), or in a nozzle of the water heater W as a plate type heat exchanger (see FIG. 2B). Further, as shown in FIGS. 3A and 3B, the water cooler R may be provided around the nozzle of the water heater W (see FIG. 3A), or may be provided around the nozzle of the water heater W to form a double tube in which cooling medium flows (see FIG. 3B).

The water cooler R may be small. That is, the hot water load WR is small, the amount of heat transfer effected in such a state that refrigerant is stored in the water heater W is small, and the heating value transmitted from the hot water pump PW is small, and hence if the heat transfer surface is inserted into the hot water path 45, such arrangement may be sufficient.

Figure 4:
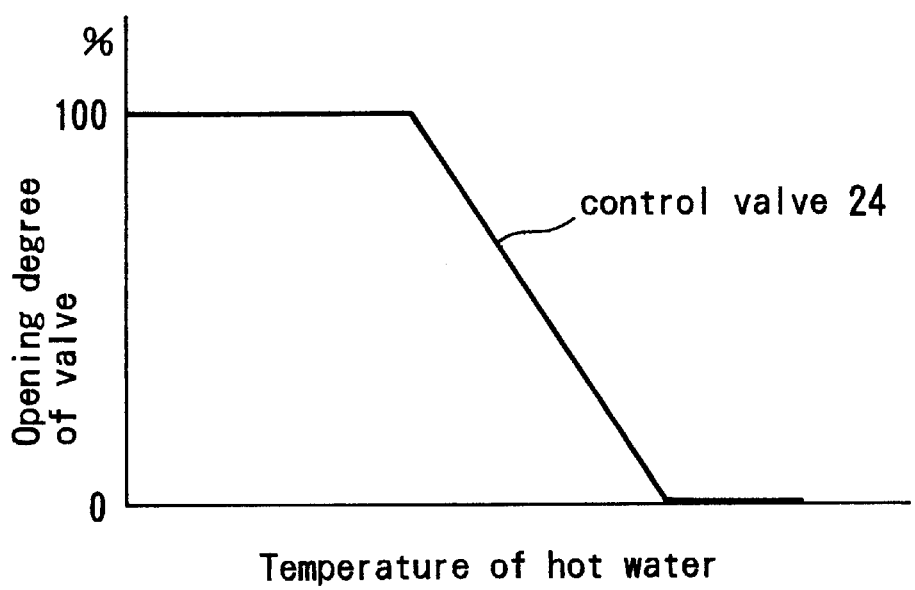
FIG. 4 is a graph showing operating characteristics of a control valve 24.

In the double effect absorption cold or hot water generating machine described above, the hot water capacity is controlled by operating the control valve 24 on the basis of a signal from the temperature sensor 32 in accordance with the characteristic curve shown in FIG. 4. In the case where the temperature of hot water is high, even if the control valve 24 is fully closed, the temperature of hot water rises in some cases due to receiving of heat from refrigerant vapor. In such cases, cooling water is supplied to the water cooler R for cooling hot water, thereby preventing the temperature of hot water from rising. The supply of cooling water may be started at the time when the opening degree of the control valve 24 reaches a given value or less, taking into account dynamic characteristic of the control valve 24.

Figure 5:
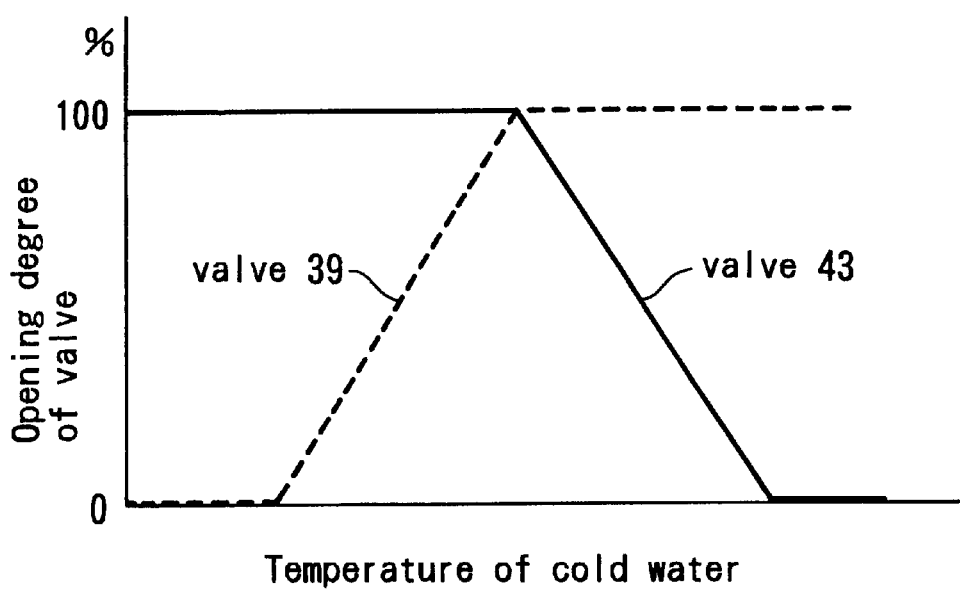
FIG. 5 is a graph showing the relationship between a refrigerant liquid control valve and a solution control valve.

The cold water capacity is controlled on the basis of a signal from the temperature sensor 31. The relationship between the refrigerant liquid control valve 39 and the solution control valve 43 is controlled in such a manner that the refrigerant liquid control valve 39 is fully opened while the solution control valve 43 is closed, and is operated toward a closing direction (or tendency) when the cold water load becomes smaller than the hot water load. In FIG. 5, the solid line represents the operation of the valve 43, and the broken line represents the operation of the valve 39. When the solution control valve 43 is closed, solution is introduced into the low temperature generator GL where the solution is heated by vapor from the high temperature generator GH and concentrated. As the solution control valve 43 is operated toward an opening direction, the flow rate of solution which bypasses the low temperature generator GL increases. When the solution control valve 43 is fully opened, almost all the flow rate of solution bypasses the low temperature generator GL, and refrigerant vapor from the high temperature generator GH becomes not to be consumed. The solution flowing in the low temperature generator GL through the pipes 2, 8 and 9 is heated by refrigerant vapor from the high temperature generator GH and concentrated, and then is returned to the absorber A as solution having absorption power. In the case where the cold water load is small, solution to be introduced into the low temperature generator GL is returned through the valve 43 to the piping 10 which allows solution to be returned to the absorber A from the low temperature generator GL, whereby solution is not heated and not concentrated in the low temperature generator GL.

When the cold water load is small and the valve 43 is almost fully opened, refrigerant vapor is prevented from flowing in the condenser C by closing the valve S1, and refrigerant is also prevented from being accumulated in the heat exchanger tube 14 by opening the valve S2. The refrigerant may be returned through the valve S2 to the absorber A (as shown in FIG. 1) or the high temperature generator GH. When the opening degree of the valve 43 is equal to or smaller than a given value, the valve S1 is opened and the valve S2 is closed.

With this arrangement, the fact that the hot water load is small can be detected by high temperature of hot water detected by the temperature sensor 32 or small opening degree of the hot water control valve 24.

According to the present invention, when the hot water load WR is small, cooling water is taken out from the inlet of the absorber A, introduced into the water cooler R provided in the hot water path 45, and returned to the outlet of the condenser C. This cooling operation prevents the temperature of hot water from rising excessively. As a cooling medium, air may be used.

Figure 6:
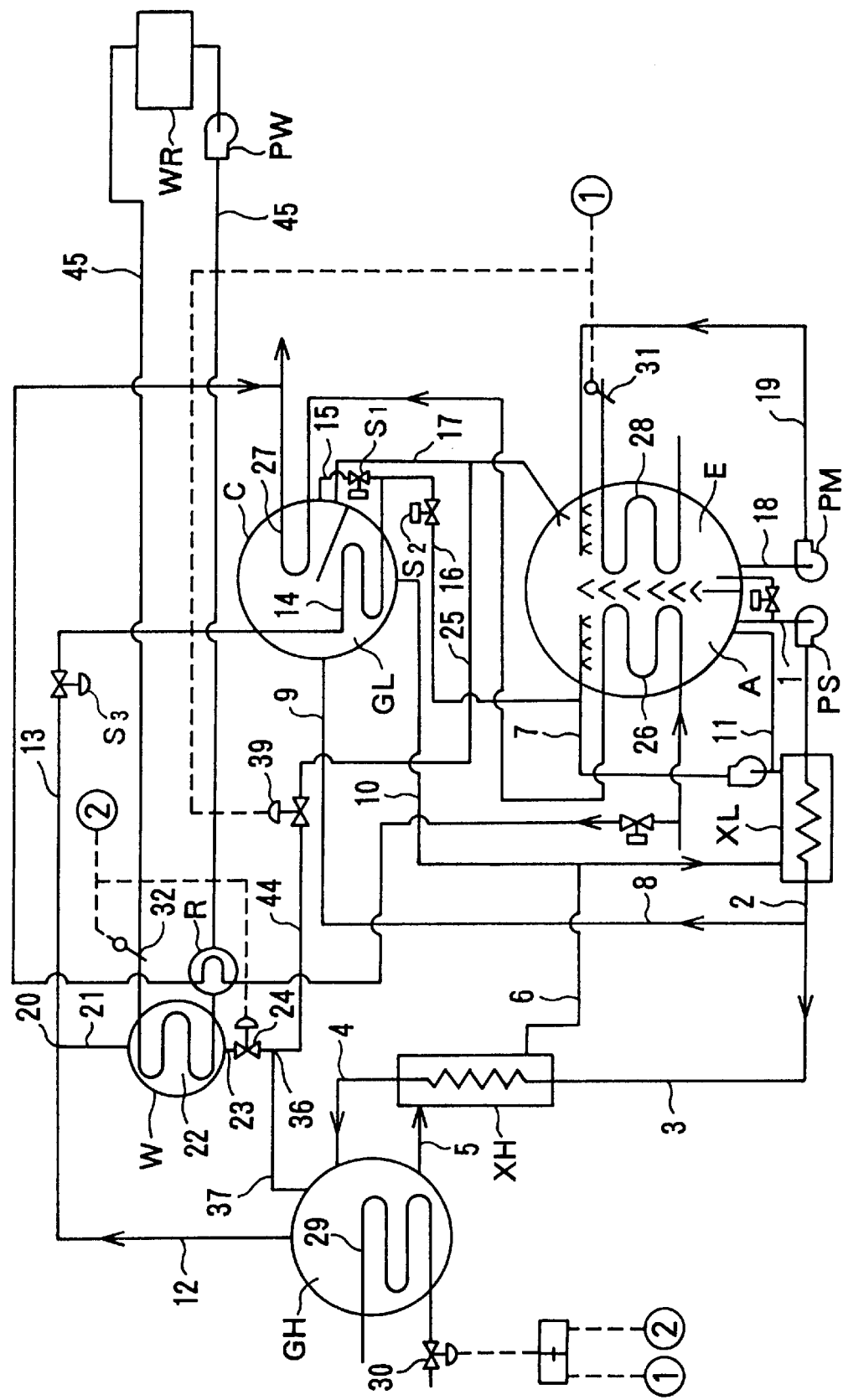
FIG. 6 is a hydraulic circuit of a double effect absorption cold or hot water generating machine according to another embodiment of the present invention.

FIG. 6 shows a hydraulic circuit of a double effect absorption cold or hot water generating machine according to another embodiment of the present invention. In the embodiment of FIG. 6, a vapor control valve S3 is used in place of the valve 43 for controlling the cold water load shown in FIG. 1. The valve S3 serves to control heating and concentration of solution by controlling the amount of refrigerant vapor fed to the heating side of the low temperature generator. When the valve S3 is operated toward an opening direction, i.e. the opening degree of the valve S3 increases, the amount of refrigerant vapor increases, and heating and concentration of solution fed to the low temperature generator is enhanced and the cold water capacity increases. When the valve S3 is operated toward a closing direction, the amount of refrigerant vapor fed to the heating side of the low temperature generator decreases, and the cold water capacity decreases.

Figure 7:
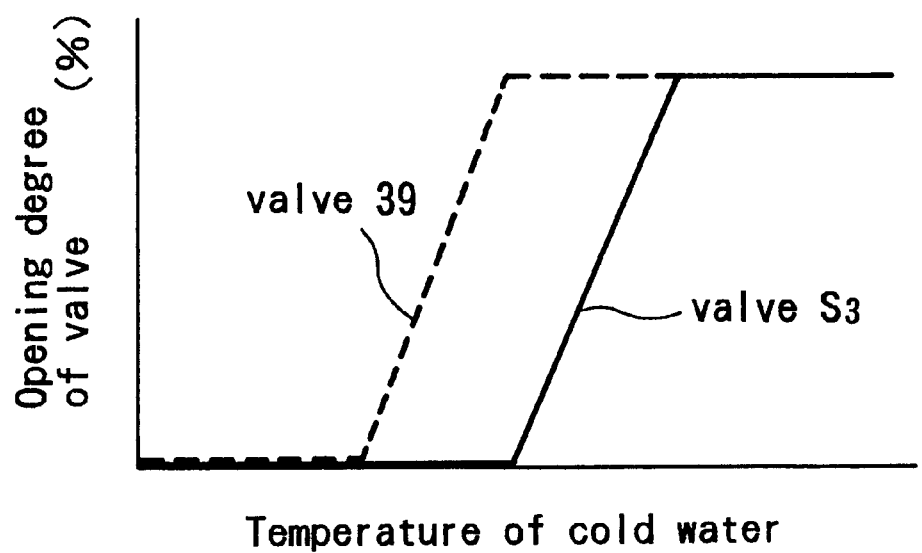
FIG. 7 is a graph showing the relationship between a refrigerant liquid control valve and a vapor control valve.

In the embodiment of FIG. 6, when the valve S3 is closed, the flow of refrigerant vapor from the piping 13 to the heater 14 is stopped, and refrigerant is prevented from blowing through the heater 14, and hence the valves S1 and S2 may be dispensed with. The valves 39 and S3 are operated in the manner shown in FIG. 7. In FIG. 7, the solid line represents the operation of the valve S3, and the broken line represents the operation of the valve 39. The operation of the valve S3 is the reverse of the operation of the valve 43 shown in FIG. 5.

Although a certain preferred embodiment of the present invention has been shown and described in detail, it should be understood that various changes and modifications may be made therein without departing from the scope of the appended claims.

What is claimed is:

1. A double effect absorption cold or hot water generating machine comprising an absorber, an evaporator, a high temperature generator, a low temperature generator, a condenser, a high temperature heat exchanger, a low temperature heat exchanger, and a water heater;

said double effect absorption cold or hot water generating machine further comprising:

a refrigerant path in a refrigerating cycle including a path from said high temperature generator to said evaporator through a refrigerant branch point at which refrigerant vapor is branched, a heating side of said low temperature generator, and said condenser;

a refrigerant path in a hot water cycle including a path from said refrigerant branch point to said high temperature generator and said evaporator through a hot water control valve, and a path for circulating refrigerant in said evaporator; and a water cooler provided in a hot water path in which hot water is heated by said water heater, said water cooler being provided in series with said water heater.

2. A double effect absorption cold or hot water generating machine according to claim 1, wherein said water heater comprises an adjusting mechanism for adjusting an output of hot water by liquid level of refrigerant liquid stored in said water heater.

3. A double effect absorption cold or hot water generating machine according to claim 2, wherein said water cooler comprises a cooling mechanism for cooling hot water by flowing cooling medium when the temperature of said hot water rises to a given value or higher, or when the output of said hot water is equal to or smaller than a given value.

4. A double effect absorption cold or hot water generating machine according to claim 3, wherein said cooling medium comprises a cooling water or an air.

5. A double effect absorption cold or hot water generating machine according to claim 2, wherein said water heater comprises a cooling mechanism for cooling hot water by flowing cooling medium in said water cooler when a hot water control valve for controlling liquid level of refrigerant liquid stored in said water heater is fully closed or is opened to a given degree or less.

6. A double effect absorption cold or hot water generating machine according to claim 5, wherein said cooling medium comprises a cooling water or an air.

7. A double effect absorption cold or hot water generating machine according to claim 1, wherein said water cooler comprises a cooling mechanism for cooling hot water by flowing cooling medium when the temperature of said hot water rises to a given value or higher, or when the output of said hot water is equal to or smaller than a given value.

8. A double effect absorption cold or hot water generating machine according to claim 7, wherein said cooling medium comprises a cooling water or an air.

* * * * *

UNITED STATES PATENT AND TRADEMARK OFFICE
CERTIFICATE OF CORRECTION

PATENT NO. : 6,116,047
DATED : Sep. 12, 2000
INVENTOR(S) : Inoue et al.

It is certified that error appears in the above-identified patent and that said Letters Patent is hereby corrected as shown below:

In the title: change the word "ABSORBTION" to read --ABSORPTION--.

In Claim 3, line 2, change "according to claim 2" to read --according to claim 1--.

Signed and Sealed this

Seventeenth Day of April, 2001

Attest:

NICHOLAS P. GODICI

Attesting Officer

Acting Director of the United States Patent and Trademark Office